Jan. 24, 1956
S. MORENA
2,731,908
IMMERSION CONTAINER FOR FOOD SEASONING OR THE LIKE
Filed June 26, 1952
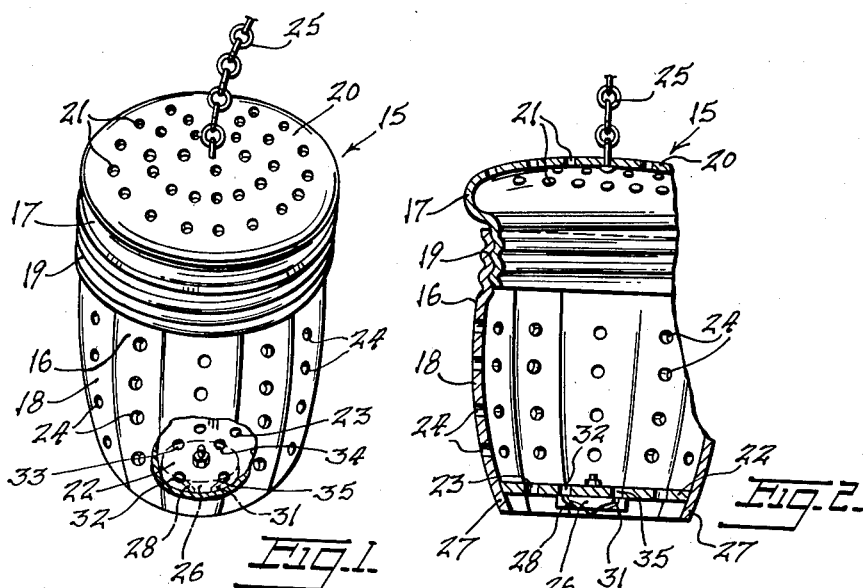
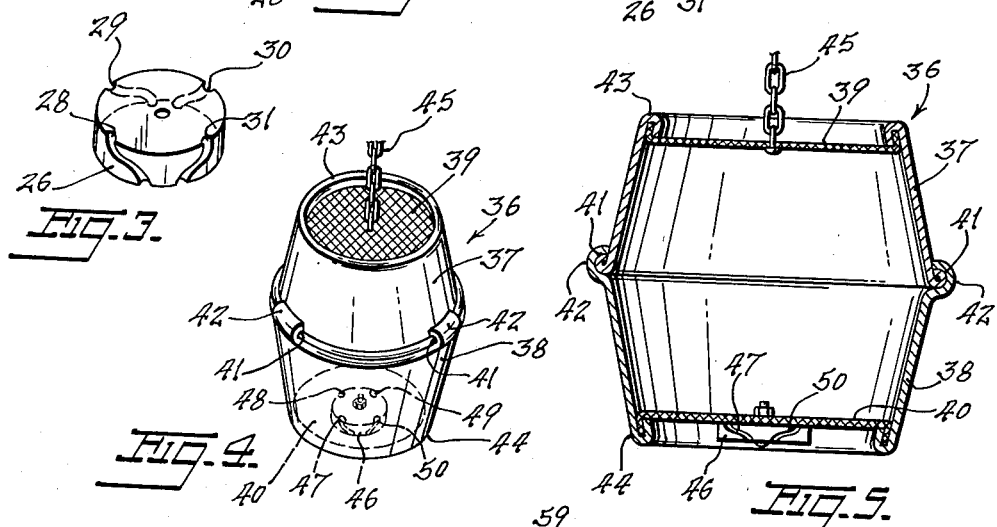
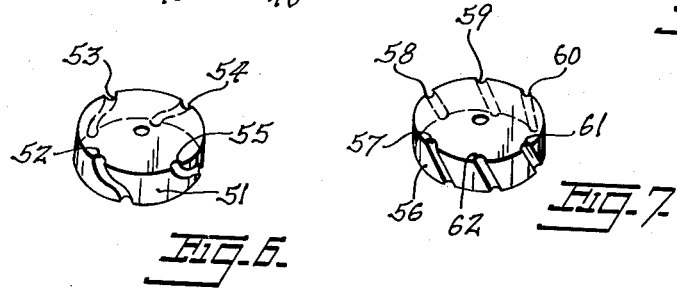
INVENTOR
SUSAN MORENA
BY
ATTORNEY

United States Patent Office 2,731,908
Patented Jan. 24, 1956

2,731,908
IMMERSION CONTAINER FOR FOOD SEASONING OR THE LIKE

Susan Morena, Bronx, N. Y.

Application June 26, 1952, Serial No. 295,700

3 Claims. (Cl. 99—414)

This invention relates to new and useful improvements in immersion containers for dissolving solid matter in a moving fluid such as a boiling liquid.

More particularly, the present invention proposes the construction of an immersion container particularly adapted for flavoring soups, gravies and similar liquids while they are cooking by immersing solid matter such as vegetables, meats or any other flavoring food into them to dissolve.

Another object of the present invention proposes forming the immersion container with a fluid directing member at its bottom to provide an induced flow into the container to stir around vegetables, meats or any other solid matter therein so it will dissolve quicker and more uniformly.

Still further, the present invention proposes constructing the immersion container so that a turbulent flow will be provided in it when the container is lowered into a moving fluid such as a boiling liquid to prevent caking of solid matter in the container at any point.

As a further object, the present invention proposes constructing the immersion container with a fluid directing member which will induce a stream of flow into the container to carry solid matter around the walls of the container for frictional disintegration during dissolution and for finer and more complete dissolution of the solid particles before they pass out of the container through perforated openings therein.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an immersion container embodying the present invention.

Fig. 2 is a fragmentary sectional view of the container shown in Fig. 1.

Fig. 3 is a perspective view of the fluid directing disc shown in Figs. 1 and 2.

Fig. 4 is a view similar to Fig. 1 but illustrating a modification of the present invention.

Fig. 5 is a vertical sectional view of the container shown in Fig. 4.

Fig. 6 is a perspective view of another fluid directing disc illustrating another modification of the present invention.

Fig. 7 is a perspective view of another fluid directing disc illustrating a further modification of the present invention.

In accordance with the first form of the invention illustrated in Figs. 1 to 3, inclusive, the immersion container 15 has a casing 16 with a removable screw top section 17 and a bottom section 18 provided with threads 19 to receive the top section 17. The casing 16 may be made of heat resisting plastic or of metal such as aluminum, stainless steel and the like.

The top section 17 has a perforated top portion 20 with perforations 21 therethrough and bottom section 18 has a bottom portion 22 with perforations 23 therethrough. In addition, bottom portion 22 has perforations 24 extending through its side walls.

Screw top section 17 and threads 19 on the bottom section 18 provide means to open casing 16 to insert solid matter in it. A chain 25 secured to the top portion 20 of top section 17 at the center thereof provides means to suspend the casing 16 with the bottom portion 22 downwardly disposed.

A central fluid directing member 26 in the form of a disc is secured to the bottom portion 22 as by welding or being integrally formed therewith. The disc member 26 partially closes the perforated bottom portion 22 of the casing 16, the disc being smaller in area than the bottom portion.

Bottom section 18 has a rim portion 27 extending beyond and below its perforated bottom portion 22 and the disc member 26 so as to provide a flat rest for the casing. This permits the casing to rest flat on a table or other flat surface while filling it with solid matter.

The fluid directing disc member 26 has peripheral openings 28, 29, 30 and 31 (see Fig. 3) to direct fluid into the hollow casing through the perforated bottom portion 22 of the casing.

Openings 28, 29, 30 and 31 in the disc member 26 are helix in shape extending from the bottom of the disc to its top and the bottom portion 22 of casing 16 has like mating openings 32, 33, 34 and 35 (Fig. 1) aligned with openings 28, 29, 30 and 31 to direct fluid into the casing. The adjacent helix openings 28 and 29 are slanted in opposite directions (see Fig. 3) as are the adjacent helix openings 30 and 31 to produce a turbulence in the casing.

When the casing 16 has solid matter put in it and is lowered by chain 25 into a boiling liquid, the liquid put in motion by the heat applied to it will be forced up through the helix openings in disc member 26 and thus directed into the casing through openings 32, 33, 34 and 35 to give a directed predetermined turbulence to the fluid in the casing coming through the other perforations in the casing.

A liquid boils when bubbles of saturated vapor are produced in the volume of the liquid. This occurs when the saturated vapor pressure is equal to the external pressure on the surface of the liquid. It is possible in a smooth vessel to superheat a liquid and have violent and irregular boiling. When, however, the immersion container 15 with its relatively sharp edges is lowered into such a superheated liquid, the formation of vapor bubbles will be immediately facilitated and the upward movement of these bubbles will force the liquid through the openings in the liquid directing disc member 26.

The modified form of the invention shown in Figs. 4 and 5 is characterized in the provision of a casing 36 having two mating frustoconical sections 37 and 38. Section 37 has a screen 39 across one end and section 38 has a like screen 40 across its similar end. The sections 37 and 38 have cooperating latching elements 41 and 42 on them respectively to hold the sections together with screen 39 disposed at the top of the casing 36 and screen 40 at the bottom.

Section 37 has a rim 43 extending beyond screen 39 to provide a flat resting surface at the top of the casing and section 38 has a like rim 44 extending beyond screen 40 to provide a flat resting surface for the casing at the bottom thereof.

A chain 45 attached to the top screen 39 at its center provides suspension means for the casing. A fluid directing disc member 46 similar to disc member 26 described above is secured, as by welding, to the bottom of the lower screen 40 partially closing the screen. The helix peripheral openings 47, 48, 49 and 50 in the disc direct fluid into the hollow casing 36 through the bottom screen 40.

The modified form of the invention shown in Fig. 6 is characterized by providing a fluid directing disc 51 with helix peripheral openings 52, 53, 54 and 55 all inclined in a like direction to direct fluid passing upwardly through them in a rotary flow into the casing.

In the modification illustrated in Fig. 7 a fluid directing disc 56 is provided with peripheral tangential slots 57, 58, 59, 60, 61 and 62 extending from the bottom of the disc to its top and inclined therebetween.

It is to be understood that the casing as well as the top and bottom screens may be made entirely of aluminum mesh or any other non-corrosive screen material.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An immersion container for dissolving solid matter in a moving fluid comprising a hollow, perforated casing, having a perforated disc constituting the bottom of said casing and spaced from the bottom end edge of the casing and a disc member having grooves, said disc member being secured to the perforated disc, whereby agitated bubbling is prevented, said grooves being on the peripheral margin of the disc and in the form of opposed grooves.

2. An immersion container for dissolving solid matter in a moving fluid comprising a hollow, perforated casing, having a perforated disc constituting the bottom of said casing and spaced from the bottom end edge of the casing and a disc member having grooves, said disc member being secured to the perforated disc, whereby agitated bubbling is prevented, said grooves being inclined in the same direction in the form of a helix.

3. An immersion container for dissolving solid matter in a moving fluid comprising a hollow, perforated casing, having a perforated disc constituting the bottom of said casing and spaced from the bottom end edge of the casing and a disc member having grooves, said disc member being secured to the perforated disc, whereby agitated bubbling is prevented, said grooves being in the form of tangential slots.

References Cited in the file of this patent

UNITED STATES PATENTS

| Number | Name | Date |
|---|---|---|
| 158,532 | Shattrick | Jan. 5, 1875 |
| 645,277 | Tourville | Mar. 13, 1900 |
| 770,863 | Koenig | Sept. 27, 1904 |
| 877,493 | Dunfee | Jan. 28, 1908 |
| 940,081 | Smith et al. | Nov. 16, 1909 |
| 1,153,913 | Heath | Sept. 21, 1915 |
| 1,231,641 | Parent | July 3, 1917 |
| 1,235,791 | Gebhardt | Aug. 7, 1917 |
| 1,345,947 | Muller | July 6, 1920 |
| 1,572,861 | Larrey | Feb. 9, 1926 |
| 1,574,021 | Bonell | Feb. 23, 1926 |
| 1,779,419 | Alexander | Oct. 28, 1930 |
| 2,133,166 | Fritsche | Oct. 11, 1938 |
| 2,250,314 | Rocke | July 22, 1941 |
| 2,355,094 | Moore | Aug. 8, 1944 |
| 2,560,214 | Cameron | July 10, 1951 |

FOREIGN PATENTS

| Number | Country | Date |
|---|---|---|
| 117,672 | Great Britain | July 25, 1918 |
| 673,237 | Germany | Mar. 18, 1939 |
| 776,531 | France | Nov. 8, 1934 |